US012192633B2

(12) United States Patent
Cheng et al.

(10) Patent No.: US 12,192,633 B2
(45) Date of Patent: *Jan. 7, 2025

(54) IMAGE CAPTURING ASSEMBLY

(71) Applicant: AVER INFORMATION INC., New Taipei (TW)

(72) Inventors: Ming-Te Cheng, New Taipei (TW); Chien-Chang Lin, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 48 days.

This patent is subject to a terminal disclaimer.

(21) Appl. No.: 18/116,265

(22) Filed: Mar. 1, 2023

(65) Prior Publication Data

US 2023/0283905 A1 Sep. 7, 2023

(30) Foreign Application Priority Data

Mar. 4, 2022 (TW) .................................. 111107868

(51) Int. Cl.
G03B 3/00 (2021.01)
H04N 23/69 (2023.01)
H04N 23/695 (2023.01)

(52) U.S. Cl.
CPC ........... *H04N 23/695* (2023.01); *H04N 23/69* (2023.01)

(58) Field of Classification Search
CPC ...... H04N 23/695; H04N 23/69; H04N 23/55; F16M 11/10; F16M 11/18; F16M 11/2014; G03B 17/561; G08B 13/1963
See application file for complete search history.

(56) References Cited

U.S. PATENT DOCUMENTS

| 6,707,996 | B2* | 3/2004 | Tsai | G03B 13/00 |
| | | | | 396/130 |
| 9,513,458 | B1* | 12/2016 | Flügge | G02B 7/08 |
| 2017/0134638 | A1* | 5/2017 | Wang | G02B 7/02 |
| 2018/0013271 | A1* | 1/2018 | Goulden | H02G 3/04 |
| 2018/0013934 | A1* | 1/2018 | Germe | G08B 25/08 |
| 2021/0263301 | A1* | 8/2021 | Oshima | G03B 21/147 |

FOREIGN PATENT DOCUMENTS

TW 503340 9/2002

* cited by examiner

*Primary Examiner* — Howard D Brown, Jr.

(74) *Attorney, Agent, or Firm* — Maschoff Brennan

(57) ABSTRACT

An image capturing assembly including a mounting base, a driving component, a first gear, a second gear, a lens assembly, a third gear and a resistance component. The driving component is disposed on the mounting base. The first gear is connected to the driving component and configured to be driven by the driving component. The second gear is pivotally connected to the mounting base and connected to the first gear. The driving component is configured to drive the second gear via the first gear. The lens assembly is fixed to the second gear. The third gear is pivotally connected to the mounting base and engaged with the second gear. The resistance component presses against the third gear to allow the third gear to transmit a resistance against the second gear during a rotation of the second gear.

10 Claims, 3 Drawing Sheets

IMAGE CAPTURING ASSEMBLY

CROSS-REFERENCE TO RELATED APPLICATIONS

This non-provisional application claims priority under 35 U.S.C. § 119(a) on Patent Application No(s). 111107868 filed in Taiwan, R.O.C. on Mar. 4, 2022, the entire contents of which are hereby incorporated by reference.

TECHNICAL FIELD

The disclosure relates to an image capturing assembly, more particularly to an image capturing assembly including one or more gears.

BACKGROUND

A PTZ (pam-tilt-zoom) camera includes a lens assembly that is configured to pan, tilt, zoom or the like. In such type of camera, the lens assembly is usually configured to pan and tilt by a motor and a gear assembly connected thereto. However, when the lens assembly pans or tilts, one or more cables connected to the lens assembly is pulled and thus is bent. Therefore, when the lens assembly stops panning or tilting, the bent cables may restore and thus apply a force on the lens assembly via gears of the gear assembly. Since there is usually a backlash between the engaged gears in the gear assembly, such force produced by the cables may move the gear connected to the lens assembly. As a result, the lens assembly may shake and thus cause the image displayed by the PTZ camera to shake, which deteriorates the user experience of the PTZ camera.

SUMMARY

The disclosure provides an image capturing assembly that prevents the lens assembly from shaking when the rotation thereof is stopped, so as to prevent the image capturing assembly from capturing images at an undesired angle, thereby enhancing the user experiences of the image capturing assembly and images captured thereby.

One embodiment of this disclosure provides an image capturing assembly including a mounting base, a driving component, a first gear, a second gear, a lens assembly, a third gear and a resistance component. The driving component is disposed on the mounting base. The first gear is connected to the driving component and configured to be driven by the driving component. The second gear is pivotally connected to the mounting base and connected to the first gear. The driving component is configured to drive the second gear via the first gear. The lens assembly is fixed to the second gear. The third gear is pivotally connected to the mounting base and engaged with the second gear. The resistance component presses against the third gear to allow the third gear to transmit a resistance against the second gear during a rotation of the second gear.

According to the image capturing assembly disclosed by above embodiments, the resistance component presses against the third gear to allow the third gear to transmit a resistance against the second gear during the rotation of the second gear. Thus, when the driving component stops driving the lens assembly via the first gear and the second gear, the resistance at least partially overcomes the restoring torque applied by one or more cables that are connected to the lens assembly and bent due to the rotation of the lens assembly. As a result, the second gear is prevented from being rotated back by the restoring torque applied by the cables due to the backlash between the gears, thereby preventing the lens assembly from shaking. Thus, the image capturing assembly is prevented from capturing images at an undesired angle, thereby enhancing the user experiences of the image capturing assembly and images captured thereby.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
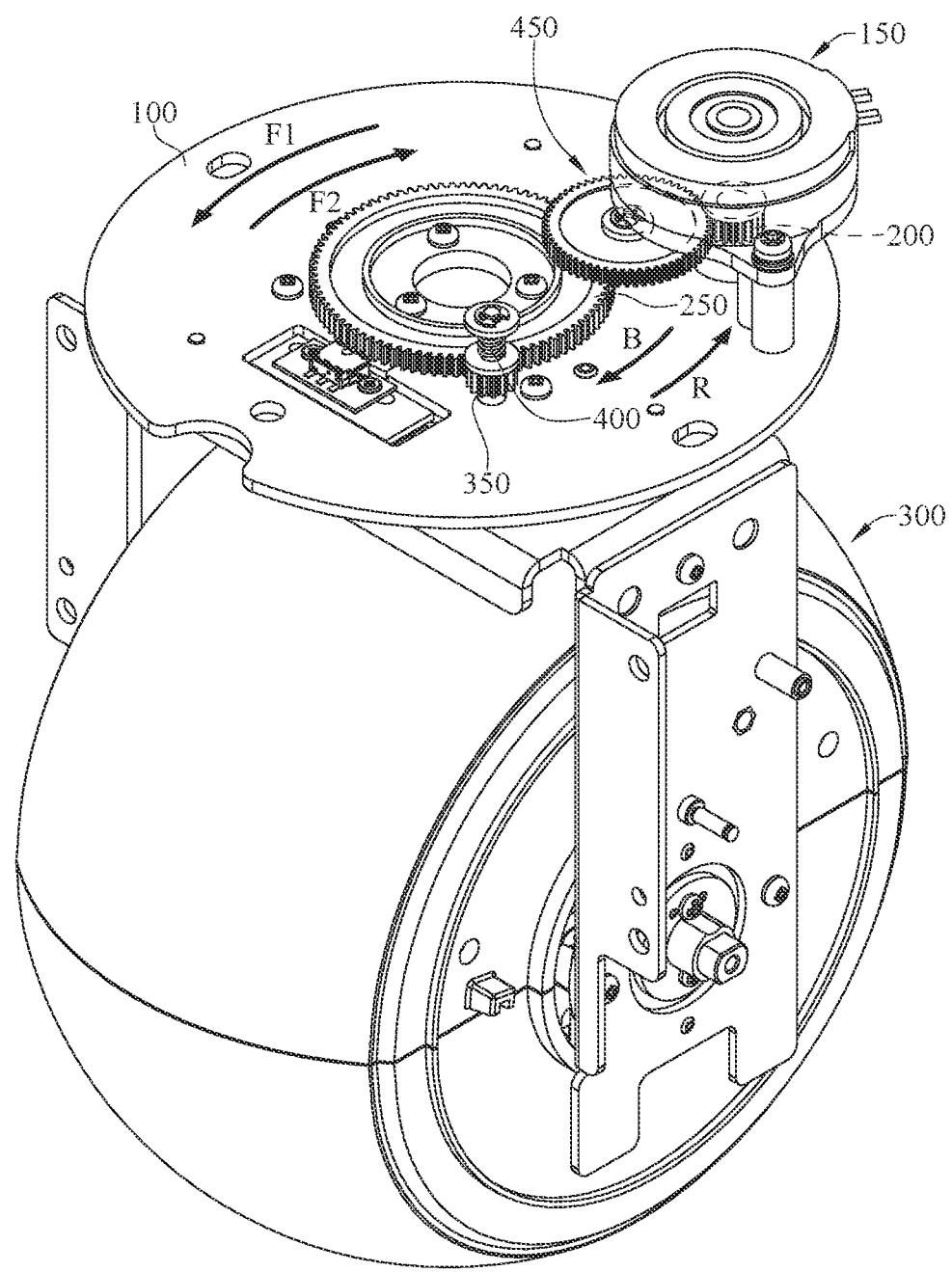
FIG. 1 is a partially enlarged perspective view of an image capturing assembly according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
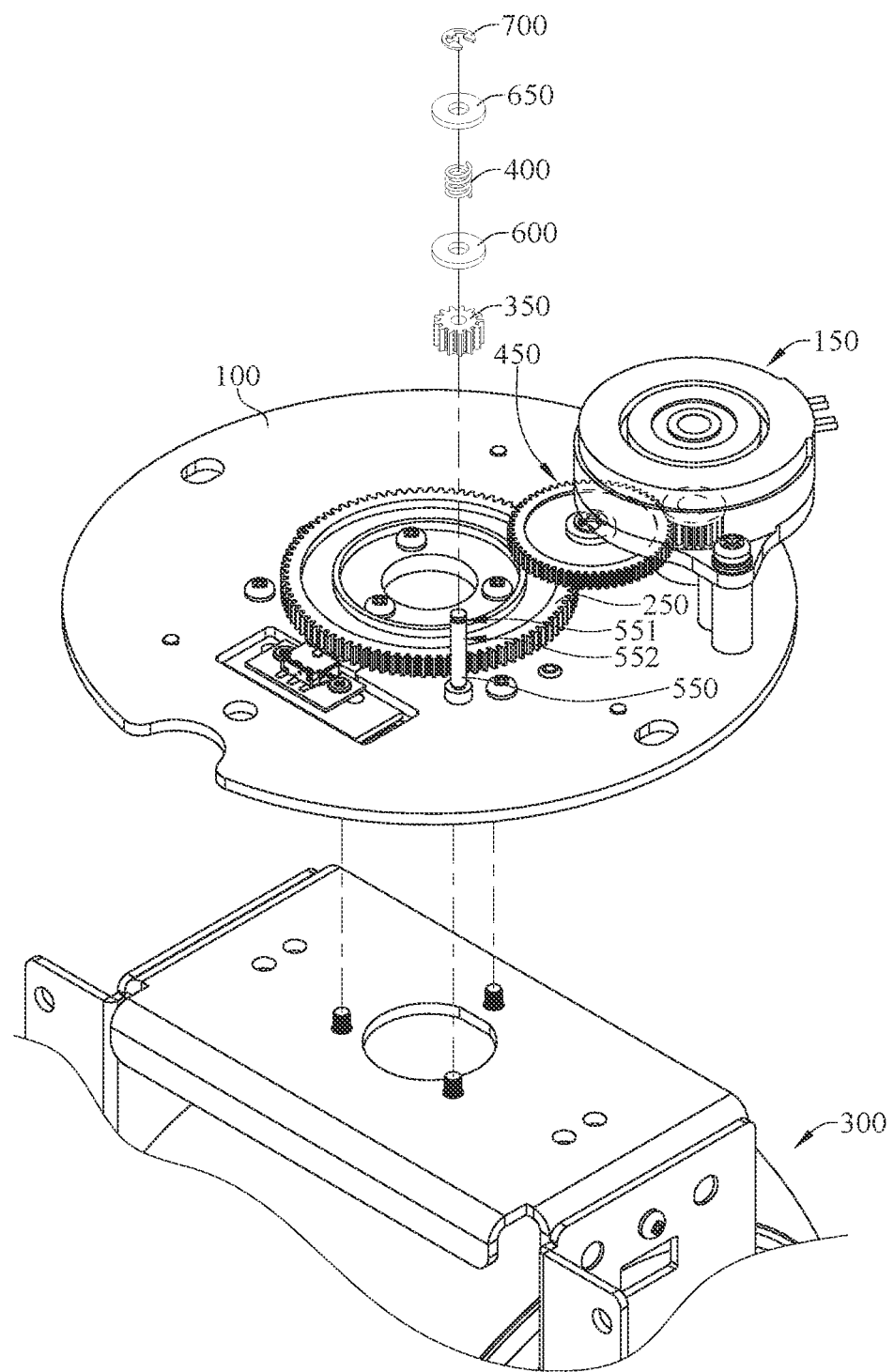
FIG. 2 is a partially enlarged exploded view of the image capturing assembly in FIG. 1.
Figure 3:
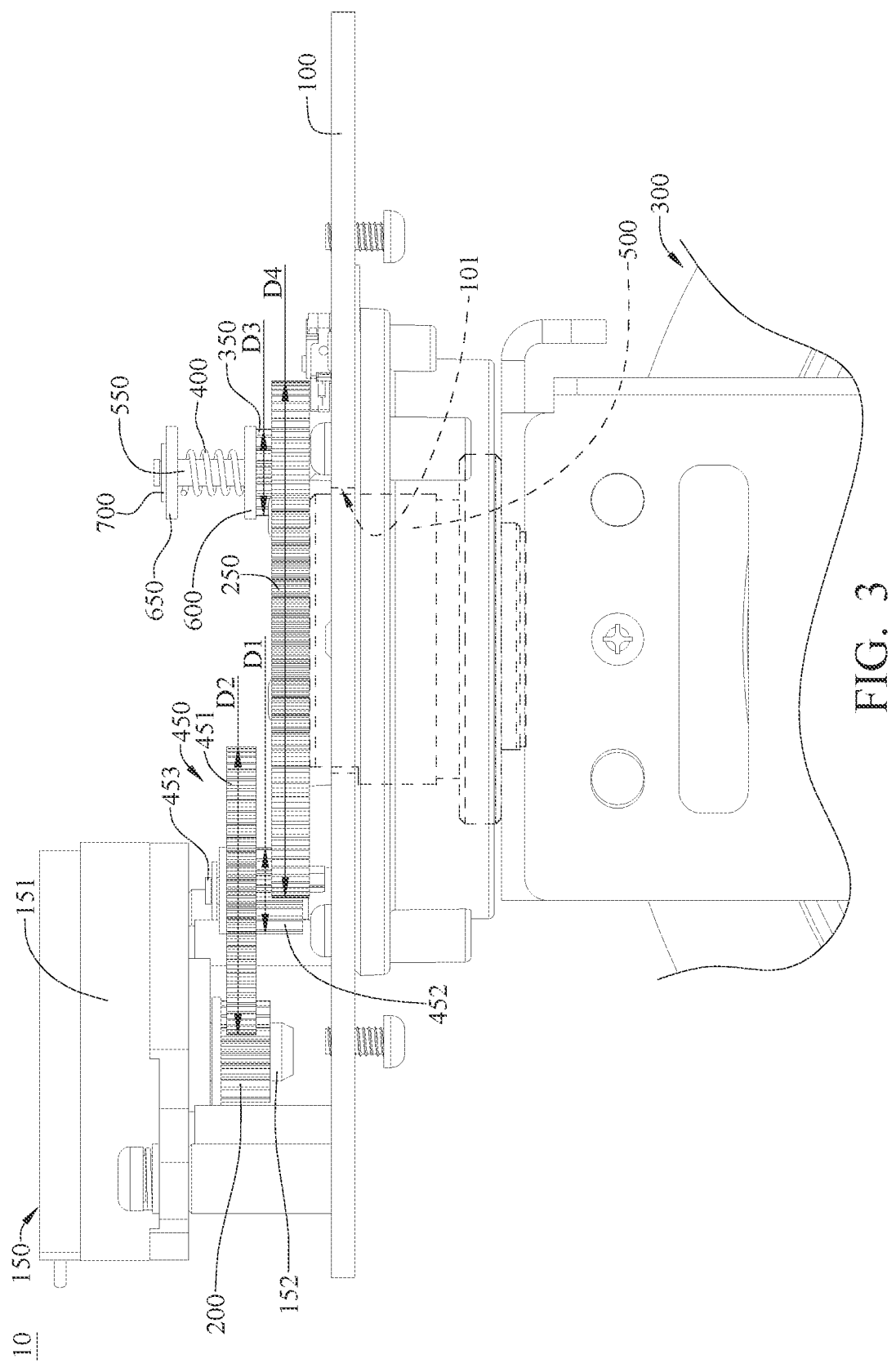
FIG. 3 is a partially enlarged front view of the image capturing assembly in FIG. 1.

Please refer to FIGS. 1 to 3. FIG. 1 is a partially enlarged perspective view of an image capturing assembly 10 according to one embodiment of the disclosure. FIG. 2 is a partially enlarged exploded view of the image capturing assembly 10 in FIG. 1. FIG. 3 is a partially enlarged front view of the image capturing assembly 10 in FIG. 1.

The image capturing assembly 10 is, for example, a PTZ (pam-tilt-zoom) camera. In this embodiment, the image capturing assembly 10 includes a mounting base 100, a driving component 150, a first gear 200, a second gear 250, a lens assembly 300, a third gear 350 and a resistance component 400.

In this embodiment, the driving component 150 is, for example, a motor and includes a main body 151 and an output shaft 152. The main body 151 is disposed on the mounting base. The output shaft 152 is rotatably disposed on the main body 151 and protrudes from the main body 151. The first gear 200 is fixed and sleeved on an end of the output shaft 152 that is located farthest away from the main body 151, and is configured to be driven by the driving component 150.

The second gear 250 is pivotally connected to the mounting base 100. The second gear 250 is connected to the first gear 200. Specifically, in this embodiment, the image capturing assembly 10 further includes a transmission gear assembly 450. The transmission gear assembly 450 includes a fourth gear 451, a fifth gear 452 and a pivot 453. The pivot 453 is pivotally connected to the mounting base 100. The fourth gear 451 and the fifth gear 452 are fixed and sleeved on the pivot 453. The fourth gear 451 is engaged with the first gear 200. The fifth gear 452 is engaged with the second gear 250. An addendum circle diameter D1 of the fifth gear 452 is smaller than an addendum circle diameter D2 of the fourth gear 451. In this embodiment, the driving component 150 drives the second gear 250 via the first gear 200 and the transmission gear assembly 450, and the transmission gear assembly 450 changes the gear ratio of the first gear 200 and the second gear 250. Note that in other embodiments, if the gear ratio of the first gear and the second gear is not required to be changed, the image capturing assembly may not include the transmission gear assembly 450, and the first gear may be engaged with the second gear.

The lens assembly 300 is fixed to the second gear 250 and configured to capture images. In this embodiment, the second gear 250 and the lens assembly 300 are located on two opposite sides of the mounting base 100, respectively. In this embodiment, the image capturing assembly 10 further includes a rotatable component 500, and the mounting base 100 has a through hole 101. The rotatable component 500 is, for example, a sleeve, and rotatably disposed in the through hole 101. The lens assembly 300 is fixed to the second gear 250 via the rotatable component 500. Note that in other embodiments, the second gear and the lens assembly may be located on the same side of the mounting base.

The third gear 350 is pivotally connected to the mounting base 100 and engaged with the second gear 250. In this embodiment, an addendum circle diameter D3 of the third gear 350 is smaller than an addendum circle diameter D4 of the second gear 250, but the disclosure is not limited thereto. In other embodiments, the addendum circle diameter of the third gear may be larger than or equal to the addendum circle diameter of the second gear.

In this embodiment, the resistance component 400 is, for example, a compression spring. In this embodiment, the image capturing assembly 10 further includes a pivot 550, a first washer 600, a second washer 650 and a clip 700. The pivot 550 is fixed on the mounting base 100. The pivot 550 is disposed through the third gear 350 so as to allow the third gear 350 to be pivotally connected to the mounting base 100. The resistance component 400 is sleeved on the pivot 550. The first washer 600 and the second washer 650 are sleeved on the pivot 550. The first washer 600 is located between the third gear 350 and the resistance component 400. Also, in this embodiment, the first washer 600 is located on a side of the third gear 350 that is located farthest away from the mounting base 100. The second washer 650 is located on a side of the resistance component 400 that is located farthest away from the first washer 600. The pivot 550 has a recess 551. The recess 551 is radially recessed from an outer circumferential surface 552 of the pivot 550. The clip 700 is, for example, a E-clip. The clip 700 is engaged in the recess 551, and the second washer 650 is located between the clip 700 and the resistance component 400. With the above configuration, the first washer 600, the second washer 650 and the clip 700 are configured to prevent the resistance component 400 from being detached from the pivot 550.

In other embodiments, the first washer may be located on a side of the third gear that is located closest to the mounting base. In other embodiments, the image capturing assembly may not include the clip 700, and in such embodiments, a protrusion protruding from the pivot may be located on a side of the second washer that is located farthest away from the resistance component for positioning the second washer. In still other embodiments, the image capturing assembly may not include the first washer 600, the second washer 650 and the clip 700, and a protrusion protruding from the pivot may be located on a side of the resistance component for positioning the resistance component.

In addition, since the resistance component 400 according to this embodiment is a compression spring, the space used to mount the resistance component 400 on the mounting base 100 is reduced, but the disclosure is not limited thereto. In other embodiments, the resistance component may be an elastic sheet or plate.

The resistance component 400 presses against the third gear 350, such that the third gear 350 applies a resistance R to the second gear 250 during the rotation of the second gear 250. Specifically, in a case that the driving component 150 drives the second gear 250 to rotate along a first direction F1 via the first gear 200 and the transmission gear assembly 450, when the driving component 150 stop driving the second gear 250, one or more cables (not shown) connected to the lens assembly 300 and bent due to the rotation of the lens assembly 300 applies a restoring force and thus a restoring torque B to the second gear 250 via the lens assembly 300 and the rotatable component 500 along a second direction F2 opposite to the first direction F1. Also, there is usually a backlash between the first gear 200 and the fourth gear 451 and a backlash between the fifth gear 452 and the second gear 250. Thus, such restoring torque B tends to rotate the second gear 250 along the second direction F2. However, the resistance component 400 pressing against the third gear 350 applies a normal force to the third gear 350, such that the friction generated by the normal force can prevent the third gear 350 from being rotated. Note that the magnitude of the friction may be obtained from an elastic constant, a compressed length and an outer diameter of the resistance component 400 (e.g., the compression spring). Such friction force is converted into a resistance R against the second gear 250, and thus the second gear 250 is prevented from being rotated by the restoring torque B along the second direction F2. Note that, in this embodiment, the resistance R is greater than or equal to the restoring torque B to completely prevent the second gear 250 from being rotated back. In addition, for example, the resistance R is smaller than the transmission torque of the second gear 250 to prevent the third gear 350 from stopping the rotation of the second gear 250.

Note that in this embodiment, only the third gear 350 engaged with the second gear 250 is disposed to prevent the second gear 250 from being rotated back, but the disclosure is not limited thereto. In other embodiments, a gear engaged with the fourth gear or the fifth gear may be additionally disposed to prevent the second gear 250 from being restored.

According to the image capturing assembly disclosed by above embodiments, the resistance component presses against the third gear to allow the third gear to transmit a resistance against the second gear during the rotation of the second gear. Thus, when the driving component stops driving the lens assembly via the first gear and the second gear, the resistance at least partially overcomes the restoring torque applied by one or more cables that are connected to the lens assembly and bent due to the rotation of the lens assembly. As a result, the second gear is prevented from being rotated back by the restoring torque applied by the cables due to the backlash between the gears, thereby preventing the lens assembly from shaking. Thus, the image capturing assembly is prevented from capturing images at an undesired angle, thereby enhancing the user experiences of the image capturing assembly and images captured thereby.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An image capturing assembly, comprising:
a mounting base;
a driving component, disposed on the mounting base;
a first gear, connected to the driving component and configured to be driven by the driving component;
a second gear, pivotally connected to the mounting base and connected to the first gear, the driving component configured to drive the second gear via the first gear;
a lens assembly, fixed to the second gear;
a third gear, pivotally connected to the mounting base and engaged with the second gear; and
a resistance component, pressing against the third gear to apply a normal force to a surface of the third gear facing away from the mounting base so as to allow the third gear to transmit a resistance against the second gear during a rotation of the second gear.

2. The image capturing assembly according to claim 1, wherein the resistance component is a compression spring.

3. The image capturing assembly according to claim 2, further comprising a pivot, a first washer and a second washer, wherein the pivot is fixed on the mounting base, the pivot is disposed through the third gear so as to allow the third gear to be pivotally connected to the mounting base, the resistance component is sleeved on the pivot, the first washer and the second washer are sleeved on the pivot, the first washer is located between the third gear and the resistance component, and the second washer is located on a side of the resistance component that is located farthest away from the first washer, the first washer is located on a side of the third gear that is located farthest away from the mounting base.

4. The image capturing assembly according to claim 3, further comprising a clip, wherein the pivot has a recess radially recessed from an outer circumferential surface of the pivot, the clip is engaged in the recess, and the second washer is located between the clip and the resistance component.

5. The image capturing assembly according to claim 3, wherein the lens assembly is configured to be connected to a cable, the second gear is rotated along a first direction, the cable is configured to apply a restoring torque to the second gear along a second direction opposite to the first direction, the resistance component prevents the third gear from being rotated by generating a friction force on the third gear, the friction force is converted into the resistance transmitted by the third gear against the second gear during the rotation of the second gear, the resistance is greater than or equal to the restoring torque, the resistance is smaller than a transmission torque of the second gear.

6. The image capturing assembly according to claim 1, further comprising a transmission gear assembly, wherein the transmission gear assembly comprises a fourth gear, a fifth gear and a pivot, the pivot is pivotally connected to the mounting base, the fourth gear and the fifth gear are fixed and sleeved on the pivot, the fourth gear is engaged with the first gear, the fifth gear is engaged with the second gear, and an addendum circle diameter of the fifth gear is smaller than an addendum circle diameter of the fourth gear.

7. The image capturing assembly according to claim 1, wherein the second gear and the lens assembly are located on two opposite sides of the mounting base, respectively.

8. The image capturing assembly according to claim 7, further comprising a rotatable component, wherein the mounting base has a through hole, the rotatable component is rotatably disposed in the through hole, and the lens assembly is fixed to the second gear via the rotatable component.

9. The image capturing assembly according to claim 1, wherein the driving component comprises a main body and an output shaft, the main body is disposed on the mounting base, the output shaft is rotatably disposed on the main body and protrudes from the main body, and the first gear is fixed and sleeved on an end of the output shaft that is located farthest away from the main body.

10. The image capturing assembly according to claim 1, wherein an addendum circle diameter of the third gear is smaller than an addendum circle diameter of the second gear.

* * * * *